June 19, 1962 J. F. DILLON, JR 3,040,184

TRANSLATION DEVICE HAVING FERROMAGNETIC CORE

Filed July 1, 1958 2 Sheets-Sheet 1

INVENTOR
J. F. DILLON, JR.
BY Harry C. Hart
ATTORNEY

INVENTOR
J. F. DILLON, JR.
BY
Harry C. Hart
ATTORNEY

United States Patent Office 3,040,184

Patented June 19, 1962

3,040,184

TRANSLATION DEVICE HAVING FERROMAGNETIC CORE

Joseph F. Dillon, Jr., Madison, N.J., assignor to Bell Telephone Laboratories, Incorporated, New York, N.Y., a corporation of New York Filed July 1, 1958, Ser. No. 745,964
6 Claims. (Cl. 307—88)

This invention relates to improvements in magnetic cored circuit elements and, in particular, to cores having novel shapes, and to a method for enhancing the magnetic properties thereof.

It has long been recognized that the magnetization within an ordinary polycrystalline magnetic material is not homogeneous. By allowing magnetic particles to settle out of a colloidal suspension onto a polished surface of a body of such material, a pattern of lines is formed. Some of the lines may be observed to move as the magnetization is varied. The lines mark high field strength boundaries between portions of the body within which the magnetization is apparently substantially homogeneous. These portions are termed "domains," and boundaries between them, "interdomain walls." Ordinarily a domain is very small with dimensions of the order of 25 microns; but on a crystallographic scale this is quite large, containing billions of atoms. The shape and size of the domains is largely determined by the incidence of impurities, defects, and strains in the polycrystalline mass. The resulting magnetic properties of a core are a sort of average for the variously sized and oriented domains in it.

In the design of soft magnetic materials, an objective is to promote the growth and parallel orientation of these domains. Success in this line of research has been achieved to the extent that when the magnetization of a sheet made of certain high permeability magnetic polycrystalline alloys is reversed, large domains, few in number, are observed separated by a simple geometric pattern of interdomain walls which move under the influence of an applied field. The configuration of these walls in magnetic metals is largely determined and the speed of their motion is substantially limited and controlled by induced eddy currents. On the other hand, in single crystals of ferrites and other nonconducting magnetic materials, the absence of eddy currents permits the applied field to penetrate the body and allows rapid wall movement essentially free from the constraint of induced eddy currents.

J. K. Galt Patent No. 2,692,978, issued October 26, 1954, following another line of research, teaches the fabrication of a ferrite core in the form of an integral polygonal ring, each of the legs of which extends in a direction of easy magnetization of a single crystal.

When the core is saturated, the material is uniformly fully polarized. In each leg the magnetization is directed along the leg so that the lines of flux are parallel, describing similar rhombic paths around the core, substantially without leakage. When such a fully magnetized core is subjected to a reversing field, there is no change in magnetism until the field reaches a threshold value termed herein the "nucleating force." As the nucleating force is exceeded, a domain of opposite uniform polarization is formed in each leg, also directed parallel to the direction of the leg but at an angle of 180 degrees to the field in the remainder of the leg. The domains of opposite polarization are separated by an interdomain wall which is a thin region in which a minimum energy transition between the opposite polarizations is effected. This wall forms at an edge of the leg; and as the new domain grows at the expense of its neighboring oppositely poled domain, the wall advances through the core. Its speed has been observed to be proportional to the excess of the applied field over a "critical field," somewhat less than the nucleating force.

When the wall completes its traverse, the magnetization of the core is completely reversed. Such cores have hysteresis loops that appear to be perfectly rectangular, that is, once the nucleating force is reached, the core reverses its magnetization completely without further increase of applied field. Indeed, once reversal is started the applied field may be reduced; and reversal will continue at a slower rate so long as the field remains greater than the critical field. For these cores, coercive force in the usual sense is indeterminate. Instead, the two values, nucleating force (a sort of coercive force for an edge), and critical field (body coercive force) are significant.

Neither of these lines of research leads directly to the production of simple interdomain wall configurations in ceramic magnetic materials, which are necessarily polycrystalline; since there are no easy directions of magnetization in a polycrystalline mass and there can be no substantial eddy currents.

The present invention is based, in part, on the discovery that under certain conditions, ceramic cores may exhibit single interdomain wall behavior. A consequence of this behavior is that, as for the single crystal cores, the lines of force must form closed paths around the core without substantial leakage. That this is effected by the formation of neatly mitered corners in a polygonal monocrystalline core of the type described, has been established by direct observation of domain patterns using several methods. It is known that the lines are substantially straight and parallel except at the corners where transitions to a different easy direction of magnetization are accomplished. These transition regions form interdomain walls of a different kind than the 180 degree walls; they are pierced by the lines of force, and do not shift with changes in magnetization. In polycrystalline cores, direct observation of interdomain walls is less reliable, and in any case, the structure of the stationary interdomain walls in polycrystalline samples is likely to be complex. Since these stationary interdomain walls contribute little to an understanding of the invention, they will be ignored in the further development of this specification. In this specification, a volume of core material forming a closed flux path of saturation magnetization will be referred to as a "domain." A domain in this sense is separated from another domain forming a closed path of flux of opposite sign by a moveable interdomain wall.

Principal objects of the present invention are: to provide magnetic modulators in which the characteristics of output signals depend critically upon the physical shape of the magnetic core; to provide electromagnetic elements which may be varied electrically and which "remember" the impedance values to which they have been set, and to realize methods for modulating electrical signals by which the pattern of modulation products is determined substantially by a special shape imparted to the magnetic core in fabrication. Related objects are to provide new apparatus for totalization, function generation, storage, and related uses in computing circuits. Another object is to provide an improved integrating circuit.

A further object of the invention is to provide a process by which cores either of single crystals or of ceramic composition not usually exhibiting single domain wall behavior may be conditioned to establish such behavior.

In a copending application of J. F. Dillon, Jr., Serial No. 621,276, filed November 9, 1956, since matured into Patent 2,938,183, issued May 24, 1960, there are disclosed certain improvements on the core of the Galt patent. It is shown that by grooving the ring, a central preferred location for the interdomain wall may be established, whereby a core can be left in a substantially stable and unmagnetized condition, containing two oppositely oriented domains of substantially equal volume. The present invention concerns additional surface features of a core by which the motion of a single interdomain wall therein may be controlled and means through which this additional control of interdomain walls within magnetized cores can be put to practical use.

The principles governing the fabrication, treatment and use of the cores of the present invention will best be apprehended by reference to the following description of illustrative embodiments thereof, taken in connection with the accompanying drawings of which:

Figure 1:
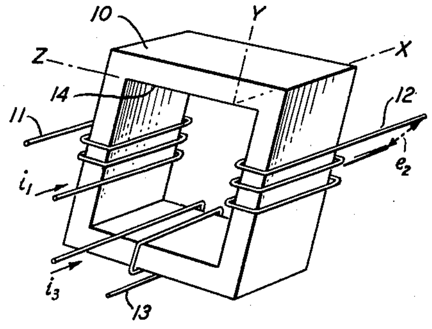
FIG. 1 is a perspective view of a simple core made from a single crystal and having three windings.

FIG. 1 represents a core 10 cut from a single crystal of high resistivity ferromagnetic material. The legs of the core are of rectangular cross section, and they extend in directions of easy magnetization for the crystalline material. The core 10 is linked with three windings, a first winding 11, a second winding 12, and a third winding 13.

Figure 2:
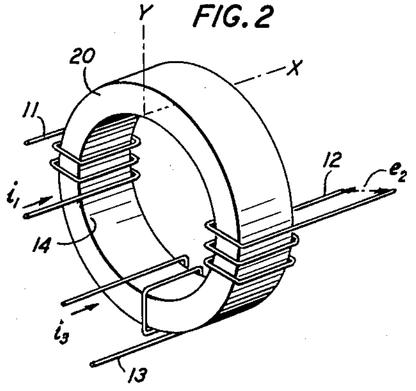
FIG. 2 is a corresponding perspective view of a ceramic core with windings.

FIG. 2 represents a device in which the core 20 is a toroid of polycrystalline ceramic yttrium-iron garnet which may be treated to exhibit single interdomain wall behavior in a manner similar to the device of FIG. 1.

Figures 3, 4, 5, 6:
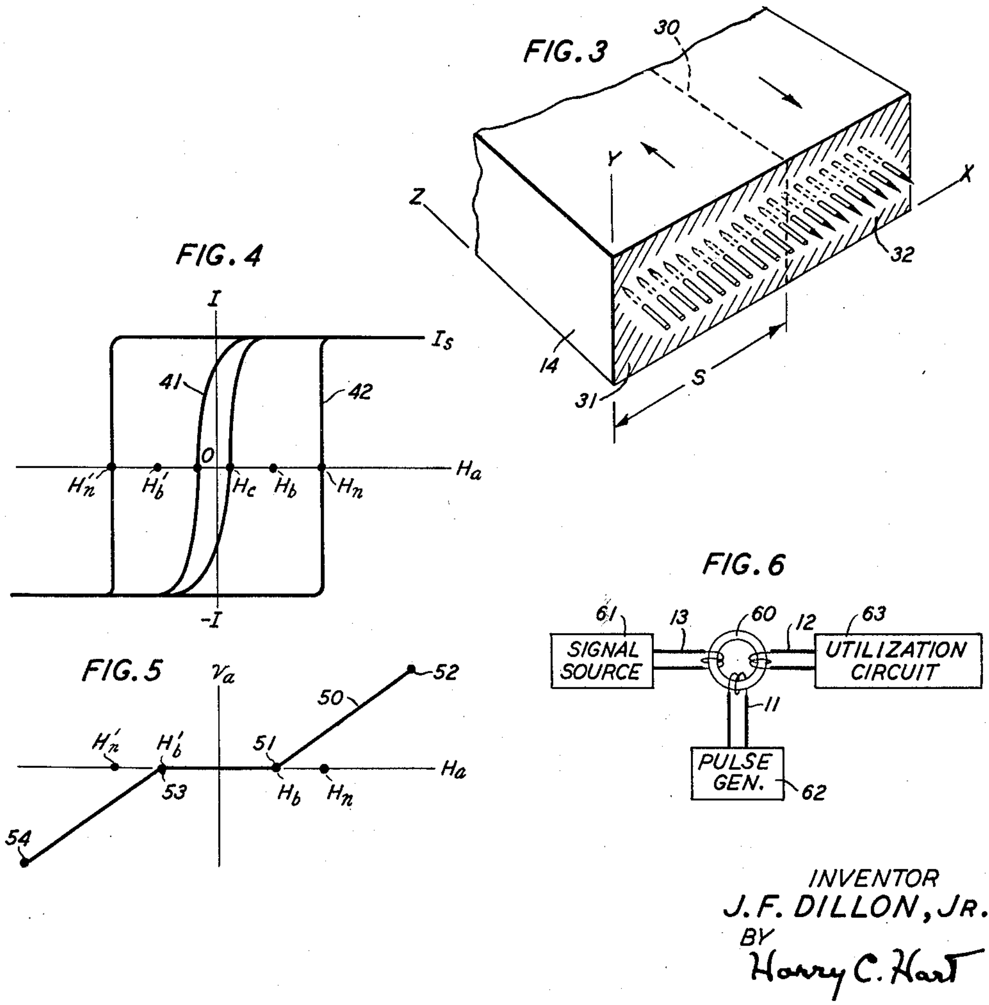
FIG. 3 is a perspective view of a leg of the core as shown in FIG. 1 cut open to show the position of an interdomain wall.
FIG. 4 is a graph showing a "D.-C." hysteresis loop of a typical core before and after treatment to promote single interdomain wall behavior.
FIG. 5 is a plot of wall velocity, $v_a$, as a function of applied field $H_a$.
FIG. 6 is a schematic diagram of apparatus utilizing the core of FIG. 1 or FIG. 2.

FIG. 3 is a perspective view, partly in section, of a leg of the core of FIG. 1. An interdomain wall 30 is shown stretched across the shorter dimension of the core separating a domain 31 of positive polarization from a domain 32 of negative polarization.

Defects in a crystal tend to break up simple domain structures. To promote single interdomain wall behavior in such a core, the core should be ground to a high degree of precision without chips, cracks or scratches. As reported by J. K. Galt in the Physical Review, volume 85, p. 664 (1952), not only external defects, but also strains within the crystal should be removed. Galt has found that improvement results from a modification of the magnetic annealing process which has been used to improve the properties of permalloy and other premium magnetic materials. The core is heated to a temperature near the Curie point and then slowly cooled to a temperature about 100 degrees centigrade below the Curie temperature in a period of the order of an hour with a saturating magnetic field applied.

In many cases, the above described treatment is insufficient to insure that substantially all the change of magnetization of the core is by single interdomain wall movement. Often 20 to 30 percent of the volume of the core retains complicated domain structures at the end of the magnetic anneal.

The hysteresis loop in such cases is not square; but more nearly approximates the well-known shape such as curve 41 in FIG. 4. It has been found that additional conditioning (termed herein the "D-anneal") extended to very low temperatures may be used to remove the remaining complex domain structure in such cases and to produce single interdomain wall motion throughout the core. Upon completion of this conditioning the hysteresis loop becomes substantially rectangular as represented by curve 42.

The "D-anneal" consists of applying to one of the windings on the core either an alternating or a direct current sufficient to produce a field of about twice the nucleating force to saturate the core and, with this field applied, cooling the core in a few minutes from a moderate temperature, such as room temperature to a low temperature such as liquid nitrogen temperature. The minimum temperature range which will be effective varies from core to core. For good monocrystalline cores, previously annealed as taught by Galt, a less rigorous treatment is required than for less perfect cores. Ceramic polycrystalline cores require lower temperatures and in many cases may not exhibit the desired single interdomain wall behavior at any temperature. The range from room temperature (around 300 degrees Kelvin) to Dry Ice temperature (about 200 degrees Kelvin) is the minimum treatment that has been found to be effective.

The frequency of reversal, if an alternating field is used, is not critical but must not be so high as to limit the complete reversal of the core in each cycle.

While the mechanism of the "D-anneal" is not fully understood, it is unlikely that this cooling produces the improved properties by strain relief as taught by Galt and still less likely that the metallurgical processes, important in the magnetic annealing of permalloy, are operative at such low temperatures. The "D-anneal" has been found effective to produce single interdomain wall behavior in single crystal cores of manganese ferrite ($Mn_{1.4}Fe_{1.6}O_4$); in which case, the cooling with an applied field may begin at room temperature although the Curie point of the material is about 200 degrees centigrade. It is found that the disposition of the domains shown in FIG. 3 is stable below 190 degrees Kelvin. This treatment also has been effective to establish single interdomain wall behavior in a polycrystalline ceramic core in toroidal form as shown in FIG. 2.

A preferred material for the ceramic core is yttrium-iron garnet. This material has the chemical formula $Y_3Fe_2(FeO_4)_3$ and the crystal structure of a garnet. The discovery of this material and of some of its magnetic properties was reported by F. Bertaut and F. Forrat in vol. 242 of Comptes Rendus, at page 382 (January 16, 1956). Subsequently, it has been recognized that this material is representative of a new class of magnetic materials in some ways superior to the class known as ferrites which have a spinel structure. In recognition of this distinction, the new materials are now generally referred to in the art as garnets. Important magnetic properties of these materials are disclosed in the above-mentioned copending patent application of J. F. Dillon.

As a specific example of the technique to produce a ceramic core having single interdomain wall behavior, a core having an outside diameter of 0.097 inch, an inside diameter 0.075 inch and a thickness of 0.0615 inch was produced and processed in the following manner. Yttrium-iron garnet ceramic was prepared by the general method disclosed for the preparation of ferrite ceramics in the copending patent application of L. G. Van Uitert, Serial No. 697,445, filed November 19, 1957, now Patent 2,981,903. Briefly, the ceramic was prepared by mixing yttrium oxide ($Y_2O_3$) and ferric oxide ($Fe_2O_3$) powders, in the proportions of 3 mols of the former to 5 mols of the latter, calcining the powders at a temperature of 1000 degrees centigrade to 1400 degrees centigrade, ball-milling the product, recalcining at the same temperature, ball-milling again, pressing a predetermined mass in a mold at a pressure of about 50,000 p.s.i., and firing at a temperature of 1300–1400 degrees centigrade. All firings were carried out in an oxidizing atmosphere.

The resulting fired blank was in the form of a disk having the final thickness of 0.0615 inch. The inside and outside cylindrical surfaces were then formed simultaneously on an ultrasonic impact grinder. For testing, windings 11, 12 and 13 as shown in FIG. 2 of fine wire were applied by hand. About ten turns distributed around the core is typical for each winding.

The toroid as formed exhibited a behavior at room temperature not differing appreciably from a similar core of polycrystalline, manganese-magnesium ferrite. For example, the hysteresis loop is represented by curve 41 in FIG. 4 wherein the magnetization I (proportional to the magnetic induction B less the applied field $H_a$) is plotted against the applied field $H_a$. The curve 41 is not sufficiently square for use in a memory circuit. The coercive force $H_c$ was measured to be about 2.20 oersteds and there is no distinction between critical field and nucleating force. That is, a field of at least 2.20 oersteds is necessary to erase a remanent magnetization and no less field will do for a partially switched core. When the core was cooled to liquid nitrogen temperature from room temperature with an applied field $H_a$ of at least 24 oersteds, the core thereafter, while remaining at the liquid nitrogen temperature, exhibited single interdomain wall behavior. The D.-C. hysteresis loop became substantially rectangular as illustrated by the curve 42 of FIG. 4 with a nucleating force $H_n$ of about 20 oersteds. The critical field $H_b$ was determined to be about 8 oersteds.

The movement of the interdomain wall which accompanies changes in magnetization can best be described with respect to coordinate axes as shown in FIGS. 1 and 3. The origin is located on an inside edge 14, the X axis is parallel to the long dimension of the section, and the Y axis lies in the direction of the short dimension of the section. These axes define the direction of the Z axis perpendicular to each; i.e., in the direction of the length of the leg of the core.

After resetting a treated core with a negative pulse stronger than the nucleating force, $H_n$, the flux within the core has the uniform value $-I_s$. Thereafter, the application of positive field in excess of the nucleating force $H_n$ causes an interdomain wall 30 to be nucleated or formed in the Y—Z plane as illustrated in FIG. 3, and to move in the direction of the X axis with a wall velocity $v_a$ in response to the applied field $H_a$. At any instant the interdomain wall 30 lies in a plane parallel to the Y—Z plane at a distance $s$ from that plane. Ahead of the moving wall in the domain 32, the magnetization remains negative; behind the wall in the domain 31, the magnetization is positive.

The interdomain wall 30 may be moved by passing current through the winding 11. Its motion may be detected and measured by observing the induced voltage $e_2$ in the winding 12.

When the magnetization of the core is reversed by applying a primary current $i_1$ to winding 11 which produces a field that is stronger than the nucleating force $H_n$, a voltage pulse appears on winding 12. The voltage in winding 12 disappears abruptly after a short interval of time. The amplitude of the voltage pulse depends linearly upon the primary current; and the duration of the voltage pulse is inversely proportional to the excess of the current over a critical value. These phenomena can be explained by the mechanism of a single interdomain wall passing through the core with a velocity linearly dependent upon the applied field. FIG. 5 is a plot of apparent interdomain wall velocity $v_a$ as a function of the applied field $H_a$. The curve 50 is made up of three straight segments, 51—52, 51—53, and 53—54. To measure the wall velocity for fields weaker than the nucleating force $H_n$, it is necessary to apply a pulse having a leading edge spike of a few microseconds duration and large enough to nucleate a single wall, which wall may then be moved by a continuing field of lesser strength, but larger than the critical field $H_b$.

For a core of the simple geometry of FIG. 1, or FIG. 2, the open circuit secondary voltage $e_2$ induced in the winding 12 by motion of a single interdomain wall is proportional to the primary current $i_1$ so long as the interdomain wall is kept moving in one direction. That is, in practical units, $$e_2 = -10^{-8} n \frac{d\Phi_f}{dt} = k(i_1 - i_b) \quad (1)$$

where $n$ is the number of turns on winding 12 and $k$ is a constant. The current $i_b$ is required to produce the critical field $H_b$ of the core and $\Phi_f$ is the ferric flux in maxwells, the contribution of the magnetization I to the total flux $\Phi$. In this analysis, the ferric flux $\Phi_f$ will be assumed equal to the total flux $\Phi$, since the contribution of the magnetizing windings to the total flux $\Phi$ is relatively small, for ferromagnetic materials of the kind contemplated for the practice of the invention. Operated under these conditions, the device is a linear circuit element, having an effective transconductance; but it differs from the more familiar inductance elements in that the induced voltage here is proportional to the current itself, not, as in those elements, to the rate of change of the current.

Figure 7:
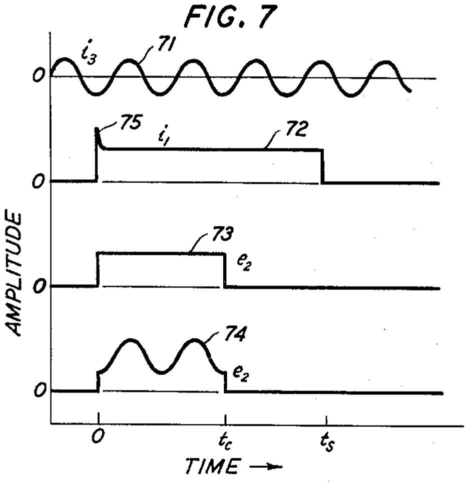
FIG. 7 is a group of wave forms in the windings of the device of FIG. 1 or FIG. 2.

This property of cores in which single interdomain wall behavior is established, leads directly to new practical devices. For example, FIG. 6 shows a signal source 61, a pulse generator 62, and a utilization circuit 63 connected to the windings 13, 11, and 12 respectively, linking a core 60 of the type shown in FIG. 1 or 2. The signal source 61 and pulse generator 62 are high impedance current sources; and the utilization circuit 63 has a high input impedance. The wave forms of interest are shown in FIG. 7 which displays, on the same time scale, the signal current 71, the switching current pulse 72, an output voltage pedestal 73, and a mixed output voltage signal 74. Starting with a completely switched core, a single interdomain wall may be driven through the core to reverse its polarity by applying a switching pulse 72 having a nucleating spike 75 of a few microseconds duration, and of sufficient intensity to overcome the nucleating force $H_n$ of the core. In the absence of input signal 71, the application of the current pulse 72 results in the output voltage pedestal 73, the duration $t_c$ of which is dependent upon the amplitude of the switching current 72, but independent of the duration $t_s$ of the switching pulse 72.

A signal current 71 applied to winding 13 is substantially blocked until the switching pulse 72 overcomes the nucleating field $H_n$ and in concert with the signal current 71 maintains the applied field $H_a$ above the critical field $H_b$. Ideally the amplitude of the pulse 72 should shift the operating point of the core to the middle of the linear portion 51—52 of the characteristic curve of FIG. 5. Then as shown in FIG. 7, the output voltage 74 made up of a signal portion on the pedestal is transmitted into the winding 12 for the duration $t_c$ of wall movement, that is, for a time which depends upon the size of the core and the strength of the applied steady current pulse 72, but which is independent of the duration $t_s$ of the steady current pulse. The device performs as a form of a switch.

The total flux threading a winding may be determined as the integral of the flux density over the area of the winding. Since the magnetization I for the material of the cores of the present invention has only two possible values, positive saturation $+I_s$ and negative saturation, $-I_s$, the net flux is proportional to the total cross-sectional area of positive domains less the cross sectional area of negative domains. The rate of change of flux, in consequence, is proportional to the rate of sweeping out cross-sectional area by the moving interdomain wall. For the core 10 having a rectangular cross section, divided into two domains 31 and 32, of rectangular cross section, it is apparent that the induced voltage $e_2$ is dependent linearly upon the magnetizing current, $i_1$ as indicated by Equation 1.

Cores of other shapes, however, offer the possibility of nonlinear electromagnetic circuit elements of great generality. For these elements, the output voltage need not be proportional to the input current. Indeed, by establishing a certain contoured surface 81 on the core as in FIG. 8A, and a similar contoured surface on the cores of FIGS. 8B and 8C, the core may be fabricated to respond to the application of a steady magnetizing pulse with an arbitrary wave form determined by the shape of the core.

Figure 9:
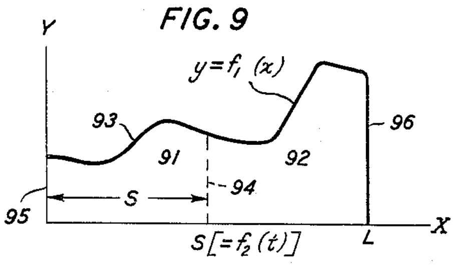
FIG. 9 is a cartesian plot of a cross section typical of cores of the types shown in FIGS. 8A, 8B, and 8C and having an arbitrary modulation contour.

FIG. 9 represents a cross section through such a core, containing a domain 91 of positive flux and a domain 92 of negative flux. The core is bounded on one surface with a modulating contour 93 defined by a spatial function, that is, $$y=f_1(x) \tag{2}$$

with respect to coordinate axes X, and Y, lying in the plane surfaces of the core, where as in FIG. 3, the X axis is parallel to the long dimension L of the section and the Y axis parallel to the short dimension.

Figure 8A:
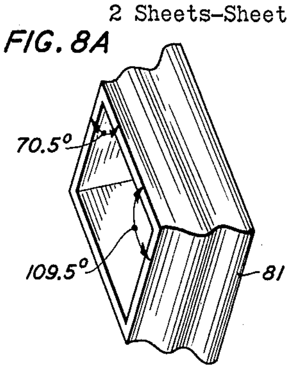
FIG. 8A is a perspective view of a monocrystalline core, in accordance with the present invention, fabricated from a single crystal and ground to an arbitrary modulating contour.
Figure 8B:
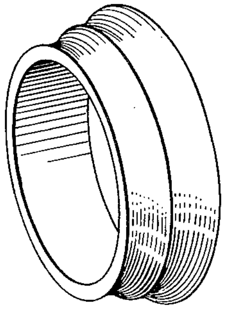
FIG. 8B is a perspective view of a ceramic core produced from a polycrystalline material and having an arbitrary modulating contour.
Figure 8C:
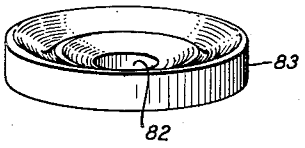
FIG. 8C is a perspective view of an alternative form of ceramic core.

In FIG. 8A and FIG. 8B, the short dimension of the cross section is parallel to plane of the ring while in the form of FIG. 8C, the short dimension is normal to the plane of the ring. Since the interdomain wall prefers the minimum area configuration, these forms constrain the wall to move in the axial and radial directions respectively. The choice between the two general arrangements in any particular case must be based on practical considerations such as relative ease in fabrication. Likewise, since the wall prefers the minimum area configuration nucleation is easier at the thin end 95 of the section (FIG. 9) than at thick end 96. In uniform cores as shown in FIGS. 1 and 2, nucleation may occur randomly at one end or the other unless one end is caused to be preferred by a small chamfer, or such. When the long dimension of the cross section extends in the plane of the ring as in FIG. 8C, there is a tendency for the wall to favor the inside edge 82 over the outside edge 83, not only because it is thinner, but also because of the lesser length of wall and higher field strength corresponding to the smaller radius. This factor must be taken into account when the configuration of FIG. 8C is employed.

For motion in the axial direction where the circumference of the wall is essentially fixed, the wall movement may be described by the relations:

$$v_a=R(H_a-H_b) \quad \text{for } H_a>H_b \tag{3a}$$

$$v_a=0 \quad \text{for } H_b'<H_a<H_b \tag{3b}$$

$$v_a=R(H_a-H_b') \quad \text{for } H_a<H_b' \tag{3c}$$

where $v_a$ is the speed of wall motion in centimeters per second or other convenient units and R is the appropriate constant of proportionality, and $H_b'$ is the critical field for negative values of applied field. These relations are represented graphically in FIG. 5 in which the three equations describe wall movement in the segments, 51—52, 52—53, and 53—54 of the curve 50, respectively. The useful range of the linear portions 51—52 and 53—54 is limited at the high end 52 and the low end 54 by the formation of multiple domains at high field strength. The interdomain wall passing through this core is represented in FIG. 9 by a dotted line 94 a distance $s$ from the origin. This distance $s$ is in general a function of time, i.e., $$s=f_2(t) \tag{4}$$

There are a few restrictions upon the functions $f_1(x)$ and $f_2(t)$. Because of the discontinuities associated with reversing the direction of wall movement $f_2(t)$ usually must be monotonic; and both $f_1$ and $f_2$ should be single valued and continuous.

Referring to FIG. 9 the ferric flux $\Phi_f$ of the core is given by:

$$\Phi_f=4\pi I_s A_1-4\pi I_s A_2 \tag{5}$$

where the area $A_1$ of domain 91 is given by $$A_1=\int_0^s f_1(x)\,dx \tag{6}$$

and the area $A_2$ of the domain 92 is $$A_2=\int_s^L f_1(x)\,dx \tag{7}$$

Similarly the saturation flux $\Phi_s$ of the core, which is a measurable constant proportional to the total area $A_3$ of the section may be expressed as $$\Phi_s=4\pi I_s A_3 \tag{8}$$

where $$A_3=\int_0^L f_1(x)\,dx=A_1+A_2 \tag{9}$$

Whence $$4\pi I_s A_2=\Phi_s-4\pi I_s A_1 \tag{10}$$

Substituting from Equation 10 into Equation 5, $$\Phi_f=8\pi I_s A_1-\Phi_s \tag{11}$$

and the rate of change of flux $$\frac{d\Phi_f}{dt}$$

is of the form $$\frac{d\Phi_f}{dt}=8\pi I_s\frac{d}{dt}\left(\int_0^s f_1(x)\,dx\right)=8\pi I_s f_1(s)\frac{ds}{dt} \tag{12}$$

Recalling that $$v_a=\frac{ds}{dt}$$

and substituting from Equation 3*a*, $$\frac{d\Phi_f}{dt}=8\pi R I_s f_1(s)(H_a-H_b) \tag{13}$$

Since, in general, the induced output voltage is proportional to the rate of change of flux, and the applied field is proportional to the winding current, it is apparent from Equation 13 that the output voltage of a device incorporating such a core depends upon both the input current wave and upon the function $f_1(x)$ which defines the shape of the core. Thus a simple current wave applied to a shape core may generate a complicated voltage wave.

The nature of the relationship between the core shape, current, and voltage may be further illuminated by the following example. Let $f_1(x)$ be represented by a polynomial in $x$ defined over the length, L, of the cross section of the core; i.e., $$y=f_1(x)=\sum_{i=0}^{l} a_i x^i \text{ for } 0<x<L \tag{14}$$

using the familiar short form of notation for the sum of terms in the polynomial, that is $$y=a_0+a_1x+a_2x^2+\ .\ .\ .\ +a_lx^l \tag{14a}$$

where any of the coefficients $a_l$ may be positive, negative or zero.

Since discontinuities are introduced if the wall reverses its direction of movement, consider $f_2(t)$ as a monotonically increasing function of time which may be expressed as the sum of a strongly monotonic polynomial in $t$ and periodic terms; i.e., $$f_2(t)=s=\sum_{j=0}^{m}b_jt^j+\sum_{k=1}^{n}c_k \sin \omega_k t \qquad (15)$$

again using the short notation for an expression of the form $$s=b_0+b_1t+b_2t^2+\ldots+b_mt^m+c_1 \sin \omega_1t+c_2 \sin \omega_2t+\ldots+c_k \sin \omega_kt \qquad (15a)$$

where the coefficients $b_j$ may be positive, negative, or zero, the coefficients $c_k$ may be positive or negative, and the angular frequencies $\omega_k$, in radians per second are considered as positive.

Differentiating Equation 15 with respect to time $$v_a=\frac{d_s}{dt}=\sum_{j=0}^{m}jb_jt^{(j-1)}=\sum_{k=1}^{n}\omega_kc_k \cos \omega_kt \qquad (16)$$

that is, $$v_a=b_1+2b_2t+3b_3t^2+\ldots+mb_mt^{(m-1)}+\omega_1c_1 \cos \omega_1t+\omega_2c_2 \cos \omega_2t+\ldots+\omega_n \cos \omega_nt \qquad (16a)$$

Substituting in Equation 12, the rate of change of flux is of the form $$\frac{d\Phi_f}{dt}=8\pi I_s\left[\sum_{j=0}^{m}jb_jt^{(j-1)}+\sum_{k=1}^{n}c_k\omega_k \cos \omega_kt\right]\cdot\left[\sum_{i=0}^{l}a_i\left(\sum_{j=0}^{m}b_jt^j+\sum_{k=1}^{n}c_k \sin \omega_kt\right)^i\right] \qquad (17)$$

or, partially expanding 17

$$\frac{d\Phi_f}{dt}=8\pi I_s[b_1+2b_2t+3b_3t^2+\ldots+mb_mt^{(m-1)}+\omega_1c_1 \cos \omega_1t+\omega_2c_2 \cos \omega_2t+\ldots][a_0+a_1(b_0\ldots+b_1t+b_2t^2+\ldots+b_mt^m+c_1 \sin \omega_1t+c_2 \sin \omega_2t+\ldots)+a_2\left(\sum_{j=0}^{n}b_1t^j+\sum_{k=1}^{m}c_k \sin \omega_kt\right)^2+\ldots+a_m\left(\sum_{j=0}^{n}b_jt^j+\sum_{k=1}^{m}c_k \sin \omega_kt\right)^m\Bigg] \qquad (17a)$$

From this it follows that in windings linking such a core, the output voltage (proportional to the rate of change of flux) is a function of the coefficients $a_i$, $b_j$, and $c_k$.

It is possible to draw certain conclusions regarding the terms which result from the multiplication of polynomials in Equations 17 and 17$a$ by inspection, without carrying out the multiplication in detail. For example, when the highest exponent of $x$ in $f_1(x)$ is zero, i.e., $l=0$ (rectangular section), the periodic terms in the second bracketed factor of Equation 17$a$ do not appear; there is no cross modulation and the output frequencies are only the input frequencies $\omega_k$. When on the other hand $l=1$, that is, the core increases in thickness linearly from one side to the other, in this case first order modulation products appear in the output comprising terms of the form $a_ic_1c_2 \sin \omega_1t \cos \omega_2t$ and $a_ic_1^2 \sin \omega_1t \cos \omega_1t$ giving rise, by the familiar trigonometric identity, to sum and difference frequencies $(\omega_1+\omega_2)$, $(\omega_1-\omega_2)$, etc. and second harmonics. For $l=2$, second order modulation products including triple sums and third harmonic terms containing the frequencies $3\omega_1$, $(2\omega_1+\omega_2)$, $(\omega_1+\omega_2+\omega_3)$ etc. appear. It is apparent that the proportions of the various modulation products depend upon the coefficients $a_i$ which describe the shape of the core, as well as the coefficients $b_j$ and $c_k$ descriptive of the monotonic pulse and of the periodic components, respectively. Complexity in the monotonic pulse, as represented, the degree $m$ of the polynomial in $t$ affects the output by a corresponding broadening of the line spectrum of modulation products.

The above analysis, while sufficient for a qualitative understanding of the invention, omits second order effects governing the motion of interdomain walls. For example, this treatment neglects the apparent mass of the wall, a factor which resists rapid changes in velocity. Eddy current damping may not be completely negligible; and there is also a springlike compliance term for small signals much less than the critical field, and there is an energy content in the wall itself which tends to make it assume positions of minimum area. Accordingly, a wall moves faster for a given field when settling into a notch than when climbing out of one; and may even drop into the bottom of a sharp groove without any driving field.

In consequence of all of these factors, the impedance of a winding depends upon the thickness and curvature of the section at the point where the interdomain wall attaches, and the transmission properties of the core may be changed by moving the interdomain wall magnetically from one position to another.

Figure 10:
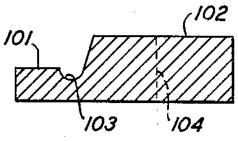
FIG. 10 is a cross section drawing of a core used as a memory device having four stable states.

A core having a contour as shown in FIG. 10 has two regions 101—102 of linear behavior which may be distinguished by a marked difference in the transconductance, and an intermediate groove 103 into which the wall 104 may be placed. The core, thus has four stable domain configurations, two polarities of complete saturation and two oppositely polarized states of partial magnetization with an interdomain wall attached to the groove 103. Additionally, intermediate conditions of magnetization may be indicated by positions of the interdomain wall in the regions 101 and 102. A number of methods are known to the prior art by which information may be stored in and retrieved from magnetic devices. Patent 2,832,945 to D. D. Christensen describes some of these methods. The four stable states just described may be distinguished by measuring, as described in the Christensen patent, the impedance of the core to signals which are too small to change the state of the core. This may be termed a nondestructive readout. Both the stable states and intermediate states may be determined by destructive read-out processes which involve driving the core to a known state of saturation by single interdomain wall movement, and observing the resulting wave form.

Figure 11:
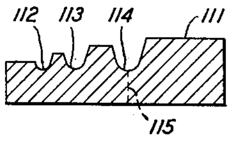
FIG. 11 is a cross section drawing of a core which extends the principles of FIG. 10 to a large number of stable states.

When required, the number of identifiable stable states in a given core may be made much more numerous, as for example, a core having a contour 111 as shown in FIG. 11, with peripheral grooves 112—114 each marking a stable position of repose for the wall 115 shown attached to the groove 114. Such a core is suitable for use as a digital storage register or as part of a frequency divider circuit of the kind described by S. Rose in "Electronics" magazine for April 11, 1958, at page 76.

Figure 12:
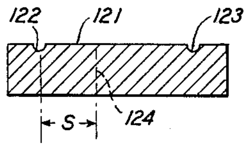
FIG. 12 is a cross section drawing appropriate for a core used in integrating circuit.

FIG. 12 is a section of a core having a substantially uniform section 121 terminated by marker grooves 122—123. By appropriate circuit arrangement the interdomain wall 124 may be preserved within the core without being lost at an edge. If the two grooves 122 and 123 are made the limits of travel for the wall, the large nucleating force necessary to form a new wall at an edge is avoided. Starting at the marker groove 122 the interdomain wall 124 by successive pulses of applied field may be moved across the uniform section 121 into the opposite marker groove 123. By integration of Equation 3$a$ it will be apparent that the distance $s$ traveled by the wall 124 from the starting marker 122 is proportional to the integral with respect to time of that portion of the applied field which exceeds the critical field. Such a core, thus, may therefore be used as an analog integrator or memory element.

Although the invention has been described in connection with certain specific examples, it will be readily apparent to those skilled in the art that various changes in the form and arrangement of parts and in the specific procedures described can be made to suit requirements without departing from the spirit and scope of the invention. In particular, it is contemplated that in addition to yttrium-iron garnet, other rare earth iron garnets, substituted rare earth iron garnets, and equivalent magnetic materials may be employed in practicing the invention, with appropriate changes in operating conditions.

What is claimed is:

1. An electromagnetic translating device comprising, in combination, a magnetized core defining a closed path for magnetic flux, said core comprising a single crystal of magnetic material in the form of an integral polygonal ring, each of the legs of which lies along a direction of easy magnetization, the cross section of said path having a longer dimension and a shorter dimension, said core having only a single interdomain wall therein in a plane parallel to said shorter dimension, said wall defining the boundary between two domains of magnetization of opposite sense, means for moving said wall at a predetermined speed in a direction substantially normal to the plane of said wall, said wall-moving means comprising means for applying to said core a signal current of a magnitude less than that required to create a magnetizing field in excess of the critical field of said core and means for applying to said core a control current of a magnitude which in concert with said signal current creates a magnetic field exceeding said critical field by a preassigned amount, the speed of movement of said wall being proportional to said preassigned amount, and load means coupled to said core, whereby said signal-applying means is magnetically coupled to said load means for and only for the duration of said wall movement.

2. An electromagnetic modulator comprising, in combination, a magnetized core defining a closed path for magnetic flux, said core comprising a ring of yttrium-iron-garnet ceramic, the cross section of said path having a longer dimension and a shorter dimension, said core having only a single interdomain wall therein in a plane parallel to said shorter dimension, said wall defining the boundary between two domains of magnetization of opposite sense, means for moving said wall at a predetermined speed in a direction substantially normal to the plane of said wall, said wall-moving means comprising means for applying to said core a signal current of a magnitude less than that required to create a magnetizing field in excess of the critical field of said core and means for applying to said core a control current of a magnitude which in concert with said signal current creates a magnetic field exceeding said critical field by a preassigned amount, the speed of movement of said wall being proportional to said preassigned amount, and load means coupled to said core, whereby said signal-applying means is magnetically coupled to said load means for and only for the duration of said wall movement.

3. An electromagnetic modulator comprising a core in the form of a ring of yttrium-iron-garnet ceramic forming a closed flux path of magnetic material which is magnetizable in two magnetic domains separated by a single interdomain wall wherein changes in magnetization are produced by motion of said interdomain wall, a first source of magnetizing force, a second source of magnetizing force, means including said first and second sources for varying the magnetization of said core in dependence on the strength of said forces and upon the shape of said core, and means for inductively extracting from said core electric signals comprising modulation products of said first and second magnetizing forces in proportions dependent upon the shape of said core, said electric signals being induced in said extracting means by changes in the magnetization of said core.

4. An electromagnetic modulator comprising a core composed of a single crystal of magnetic material cut in the form of an integral polygonal ring, each of the legs of which lies along a direction of easy magnetization, said core being magnetizable in two magnetic domains separated by a single interdomain wall wherein changes in magnetization are produced by motion of said interdomain wall, a first source of magnetizing force, a second source of magnetizing force, means including said first and second sources for varying the magnetization of said core in dependence on the strength of said forces and upon the shape of said core, and means for inductively extracting from said core electric signals comprising modulation products of said first and second magnetizing forces in proportions dependent upon the shape of said core, said electric signals being induced in said extracting means by changes in the magnetization of said core.

5. An electromagnetic modulator comprising a core composed of a single crystal of yttrium-iron garnet cut in the form of an integral polygonal ring, each of the legs of which lies along a direction of easy magnetization, said core being magnetizable in two magnetic domains separated by a single interdomain wall wherein changes in magnetization are produced by motion of said interdomain wall, a first source of magnetizing force, a second source of magnetizing force, means including said first and second sources for varying the magnetization of said core in dependence on the strength of said forces and upon the shape of said core, and means for inductively extracting from said core electric signals comprising modulation products of said first and second magnetizing forces in proportions dependent upon the shape of said core, said electric signals being induced in said extracting means by changes in the magnetization of said core.

6. An electromagnetic modulator comprising a core composed of a single crystal of manganese ferrite cut in the form of an integral polygonal ring, each of the legs of which lies along a direction of easy magnetization, said core being magnetizable in two magnetic domains separated by a single interdomain wall wherein changes in magnetization are produced by motion of said interdomain wall, a first source of magnetizing force, a second source of magnetizing force, means including said first and second sources for varying the magnetization of said core in dependence on the strength of said forces and upon the shape of said core, and means for inductively extracting from said core electric signals comprising modulation products of said first and second magnetizing forces in proportions dependent upon the shape of said core, said electric signals being induced in said extracting means by changes in the magnetization of said core.

References Cited in the file of this patent

UNITED STATES PATENTS

| | | |
|---|---|---|
| 2,692,978 | Galt | Oct. 26, 1954 |
| 2,762,778 | Gorter | Sept. 11, 1956 |
| 2,825,820 | Sims | Mar. 4, 1958 |
| 2,837,483 | Hakker et al. | June 2, 1958 |
| 2,854,412 | Brockman et al. | Sept. 30, 1958 |
| 2,854,586 | Eckert | Sept. 30, 1958 |
| 2,868,999 | Garfinkel et al. | Jan. 13, 1959 |
| 2,883,604 | Mortimer | Apr. 21, 1959 |
| 2,938,183 | Dillon | May 24, 1960 |

OTHER REFERENCES

"Ferro-Magnetic Domains," Electrical Engineering, September 1950, H. J. Williams, pages 817–822.

"Magnetic Materials for Digital-Computer Components," N. Menyuk, Journal of Applied Physics, vol. 26, No. 1, January 1955, pp. 8–18.